United States Patent
Bertha et al.

(10) Patent No.: US 6,533,829 B1
(45) Date of Patent: Mar. 18, 2003

(54) ADDITIVE FOR STABILIZING WATER-CONTAINING FUELS AND A FUEL STABILIZED WITH THIS ADDITIVE

(76) Inventors: András Bertha, Mária tér 4., H-1011 Budapest (HU); Levente Fülöp, Bartók Béla út 29., H-8315 Vonyarcvashegy (HU)

(*) Notice: Subject to any disclaimer, the term of this patent is extended or adjusted under 35 U.S.C. 154(b) by 0 days.

(21) Appl. No.: 09/980,929

(22) PCT Filed: May 5, 2000

(86) PCT No.: PCT/HU00/00041

§ 371 (c)(1),
(2), (4) Date: Apr. 1, 2002

(87) PCT Pub. No.: WO00/69999

PCT Pub. Date: Nov. 23, 2000

(30) Foreign Application Priority Data

May 14, 1999 (HU) .............................................. 9901605

(51) Int. Cl.$^7$ ................................ C10L 1/18; C10L 1/22
(52) U.S. Cl. .............................. 44/302; 44/385; 44/403; 44/411
(58) Field of Search ........................... 44/302, 385, 403, 44/411

(56) References Cited

U.S. PATENT DOCUMENTS 5,721,199 A * 2/1998 Moses ........................ 508/183
5,945,026 A * 8/1999 Thames ...................... 252/8.05

* cited by examiner

Primary Examiner—Cephia D. Toomer
(74) Attorney, Agent, or Firm—Susan J. Friedman

(57) ABSTRACT

The invention relates to an additive for stabilizing a water-containing liquid hydrocarbon fuel, which comprises an alcohol of 5–10 carbon atoms, 0.5–3 parts by weight, calculated for 1 part by weight of said alcohol, of a carboxylic amide of 5–10 carbon atoms, and 3–10 parts by weight, calculated for 1 part by weight of said alcohol, of a carboxylic acid of 5–10 carbon atoms. The invention also relates to a stabilized liquid fuel for an internal combustion engine, which comprises 10–40% by weight of water, 45–85% by weight of a liquid hydrocarbon fuel, and 5–15% by weight of an additive as defined above, all percentages being calculated for the total weight of said liquid fuel.

20 Claims, No Drawings

ADDITIVE FOR STABILIZING WATER-CONTAINING FUELS AND A FUEL STABILIZED WITH THIS ADDITIVE

FIELD OF THE INVENTION

The invention relates to an additive which can be used with good results to stabilize liquid fuels which, beside liquid hydrocarbons (such as petrol, gasoline, diesel fuel, kerosine) utilised as fuels for internal combustion engines, also contain water. The invention also relates to fuels stabilized with said additive, as well as to a process for preparing thereof. The invention also relates to the use of said additives to stabilize water-containing liquid hydrocarbon fuels, as well as to the use of such stabilized fuels to operate internal combustion engines.

BACKGROUND OF THE INVENTION

It is known that the performance of internal combustion engines can be increased by adding water to the liquid organic fuel. The amount of liquid organic fuel required to operate the engine can also be reduced by adding water to it. A favourable consequence of the above is that the octane number of gasoline can be increased by adding water to it, and, as a second favourable consequence, environmental damages resulting from the combustion of organic fuels can be suppressed.

Although since about 60 years efforts have been taken to exploit the above advantages as full as possible, by the solutions known before it could be done only on the expense of very high investments, which sometimes have not been in proportion to the attained results. Thus, for example, during the second world war—in order to increase the performance—such a technical solution was applied for Focker type fighters where water was injected into the cylinders of the engine by a separate injector after the electric ignition. Indeed, this solution resulted in a 10–15% increase in performance, however, to operate the engines, it was required to modify their structure and to install an exactly adjusted injector. With aircrafts it was a considerable further disadvantage that mounting of the injector and of a separate water tank resulted in an undesired increase in weight.

According to the method disclosed in EP 0 177 484 A1 a dispersion of fuel and water has been injected into the combustion chamber of the engine. For this end considerable technical modifications had to be performed on the structure of the engine, and various additional structural elements (such as heat exchanger, collector, etc.) had also to be installed. The solution disclosed in EP 0 142 580 A1 is based on the same principle; it differs from the previous one essentially only in the structural modifications performed on the engine.

According to the method disclosed in EP 0 311 877 A2 water has been introduced into the combustion chamber as steam rather than as a dispersion formed with the fuel. This requires the use of a specific cylinder head, and several accessories hadd also to be installed to the engine.

Thus, the solutions listed above have the common disadvantage that both the engine and its technical surroundings should be modified considerably which, on one hand, runs with high costs, and, on the other hand, the thus-modified structure cannot be operated with a conventional fuel any more. Structural modifications were required primarily because the aqueous fuel could not be stabilized for a sufficiently prolonged period of time which would enable a safe operation, thus one had to form the water/fuel mixture directly in the combustion chamber from its components. These solutions did not attain a widespread practical use, just because of the specific structural requirements discussed above.

U.S. Pat. No. 5 156 114 discloses the use of liquid fuels containing 20–80 v/v % of water in internal combustion engines. This solution also requires a modification of the engine in such a way that a hydrogen-evolving catalyst should be placed into the combustion chamber, generally as the electrically negative pole of the ignition. This hydrogen-evolving catalyst converts at least part of the water, introduced together with the organic fuel, into hydrogen and oxygen, and the evolved hydrogen is combusted together with the organic fuel. The resulting power surplus, together with the power surplus resulting from steam expansion, fully compensates for the power loss which arises from lowering the amount of the organic fuel.

This patent discusses primarily the use of aqueous methanol or aqueous ethanol as fuel, where inhomogenity problems do not emerge, since both of the organic components are fully miscible with water. In one of the examples the author also refers to the use of aqueous diesel fuel, and remarks here that the fuel mix should be used as an emulsion, and additional bypipes should be fit to the engine in order to avoid undesirable water condensation. No data can be found in this paper on the stability of the emulsion comprising water and organic hydrocarbon fuel; and only a very general information is given on the applicable surfactants, saying that all of the commercially available substances which assist hydrocarbon fuels to be dispersed in water fit for this purpose.

One of the disadvantages of the solution disclosed in the cited paper is that the engine (and, when hydrocarbon fuels are used, its accessories, too) should still be modified, although these modifications are no more disturbing when the engine is operated with hydrocarbon fuel alone. As a much more serious disadvantage, the engine can be operated either with a fully water-miscible fuel type (i.e. with alcohol or aqueous alcohol) or with a water-immiscible fuel type (i.e. with a hydrocarbon or with an emulsion of water and hydrocarbon), because any eventual mixing of the two fuel types immediately causes stability problems and operational disturbances associated therewith. Thus when the fuel type actually filled into the tank is not available at the refuelling station, either the content of the tank should be consumed completely before changing the fuel type, or the vehicle should be equipped with two separate fuel tanks. Of course, such stability problems may also arise when the hydrocarbon-based fuels already present in the tank and to be topped up have different water contents. As a serious insufficiency, the cited paper does not give any actual solution on the stabilization of water-containing liquid hydrocarbon fuels. Thus, despite of its advantages, the solution disclosed in the cited patent has not become widespread with internal combustion engines operated with liquid hydrocarbons.

In our previous international patent application No. PCT/HU97/00029 we have disclosed a method for stabilizing aqueous mixtures of liquid hydrocarbon fuels with various surfactants or surfactant mixtures. By a proper selection of the emuls-fying agents and combinations thereof we succeeded to form aqueous liquid hydrocarbon fuel compositions which were stable for a relatively prolonged period of time and which could be directly combusted in all types of the widely used internal combustion engines, without requiring the engine to be modified or additional accessories to be installed. In this way all of the favourable consequences of water introduction (increase in power, savings in hydrocarbons, increase in octane number, etc.) can be well exploited without modifying the structures of the existing engines.

Upon a more accurate evaluation of the demands it appeared, however, that, with regard to the requirements of operational safety, transporting and storage, only those water-containing liquid hydrocarbon fuels can find commercial utility which, in addition to providing all the advantages attributable to the presence of water, are fully clear, transparent and free of sediments, retain this state for several years, and are relatively insensitive to being mixed with a fuel of other water content ("topping up"). The compositions disclosed in the cited patent application do not fully satisfy these increased requirements.

Continuing our research work we have found, unexpectedly, that aqueous liquid hydrocarbon fuels which fully meet the above requirements can be obtained when they are stabilized with an additive comprising an alcohol of 5–10 carbon atoms, 0.5–3 parts by weight, calculated for 1 part by weight of said alcohol, of a carboxylic amide of 5–10 carbon atoms, and 3–10 parts by weight, calculated for 1 part by weight of said alcohol, of a carboxylic acid of 5–10 carbon atoms.

Thus, in one aspect, the invention relates to an additive of the above composition.

DETAILED DESCRIPTION OF THE INVENTION

The additive according to the invention differs from the compositions suggested before to stabilize aqueous liquid hydrocarbon fuels basically in that none of its components is a surfactant. It is extremely surprising that when this additive is mixed with water and a liquid hydrocarbon fuel a fully clear, transparent liquid is obtained, which retains its stability for several years (the oldest ones of the samples tested till the priority date did not change after a storage of 3 years). It has also been found that when the additive according to the invention is added to a mixture of a liquid hydrocarbon fuel and water, a slight warming occurs upon mixing. This phenomenon does not occur when the additive is mixed only with water or only with liquid hydrocarbon fuel, even more, sometimes a limited water-miscibility is observed. Although we do not intend to bound our invention to theoretical considerations, on the basis of the above we assume that in the joint presence of water and liquid hydrocarbon fuel the individual components of the additive react with one another and/or with water and/or with the liquid hydrocarbon in a hitherto non-elucidated way, and, as a result of this(these) chemical reaction(s), a continuous phase transition on an almost molecular level occurs between the initially immiscible aqueous and oily components.

The carbon backbone of the alcohols, carboxylic amides and carboxylic acids present in the additive according to the invention may be straight-chained, branched or cyclic, and may optionally contain unsaturated bonds, but aromatic structures are excluded. The alcohols may be monohydric and polyhydric ones, of which the polyhydric alcohols (polyols) are preferred. Similarly, the carboxylic acids may also be mono- or polycarboxylic acids, of which the latter ones are preferred. The carboxylic amides may be amides derived from mono- or polycarboxylic acids, including those compounds which are partially amidated on the carboxy groups.

The alcohol, carboxylic amide and carboxylic acid components may be either single compounds or they may be mixtures of two or more alcohols, carboxylic amides or carboxylic acids, respectively.

If desired, one or more conventional fuel additives may also be admixed with the additive according to the invention. Such conventional fuel additives are e.g. cetane number increasing agents, combustion accelerators, wear improving agents and corrosion inhibitors. These substances can be added to the additive according to the invention in the usual amounts defined by their purposes, which is well known to one skilled in the art.

In a further aspect, the invention relates to a stabilized liquid fuel for internal combustion engines, which comprises, calculated for the total weight of the fuel, 10–40 (preferably 15–35) % by weight of water, 45–85 (preferably 50–70) % by weight of a liquid hydrocarbon fuel, and 5–15 (preferably 10–15) % by weight of a stabilizing additive as defined above.

The stabilized liquid fuel according to the invention may comprise preferably tap water, with no regard of its hardness, however, demineralized water and distilled water can also be used.

The liquid hydrocarbon fuel component of the stabilized fuel according to the invention may be any of the liquid hydrocarbon cuts conventionally used to operate an internal combustion engine, of which petrol, gasoline, diesel fuel and kerosine are mentioned. The stabilized liquid fuel according to the invention may also comprise, beside the additive according to the invention, one or more other conventional additives, such as cetane number increasing agents, corrosion inhibitors, etc., which may be present in their conventional amounts. These other additives are also included in the term and amount of liquid hydrocarbon fuel, thus the term "liquid hydrocarbon fuel" also covers liquid hydrocarbon fuels comprising one or more conventional additive(s). Here we remark that when the liquid hydrocarbon is petrol, it is not required to add an octane number increasing additive to the stabilized liquid fuel according to the invention, since the water present exerts a considerable octane number increasing effect. This is a very important advantage of the petrol-based fuel stabilized according to the invention.

When the liquid hydrocarbon component of the aqueous fuel to be stabilized is one of the first (light) cuts of mineral oil distillation, it is generally preferred to use an additive where the individual components contain up to 7 carbon atoms.

The stabilized liquid fuel according to the invention is prepared by mixing the components with one another. As it is a very simple operation, it can be performed at the place of storage or even just before the use of the fuel. Although the order of introducing the components to be mixed with one another is not too critical, due to its simplicity it proved to be preferable to add the additive according to the invention, as a preformed mix, to a preformed mix of water and liquid hydrocarbon fuel. The optionally required further additives, if they are not already present in the additive and/or in the liquid hydrocarbon fuel, can be introduced in any step. However, the components can be admixed in a different order. Even more, the individual components of the additive according to the invention can be admixed separately with the fuel components, although it is a more laboursome and less advantageous solution.

In a further aspect, the invention relates to the use of an additive according to the invention for stabilizing a water-containing liquid hydrocarbon fuel. The invention also relates to the use of a stabilized fuel according to the invention to operate an internal combustion engine.

In our operation tests we have found that the stabilized fuel according to the invention can be admixed ("topped up") with another fuel without any decrease in power or any other observable change in the operation of the engine, provided that the liquid hydrocarbon present in the two fuels is of the same type. This is a very important advantage with respect of refueling. Thus the stabilizing additive according to the invention has the additional advantage that it can well balance the eventual quality differences between fuels obtainable at different refuelling stations, and it enables one to admix the stabilized fuel according to the invention with a conventional (water-free) fuel without any hitch.

A further advantage of the additive according to the invention is that, when the engine is operated, all of its components are fully combusted without providing harmful substances, and no harmful substances are exhausted to the environment from the additive. In our operation tests engines operated with the stabilized fuel according to the invention were tested for their emissions, and exhaust gases were analysed for their compositions. The parameters important from the aspects of environment protection (NO, $NO_x$, CO, $CO_2$) were always found to be much more favourable than those observed with engines operated with the same liquid hydrocarbon fuel containing no water and no additive according to the invention. With diesel fuel operated engines a considerable decrease in smoke emission was observed.

Further details of the invention are presented in the following non-limiting Examples.

EXAMPLES

This example presents the preparation of a fuel applicable for a petrol-operated, four-stroke engine equipped with an injector and with a catalyst. The experiences obtained on a trial run, and the quality test results of the fuel are also given.

A Mazda 626 type passenger car equipped with a 2.2 liter injector engine of 12 valves, which had run before 318,000 km, was used as test vehicle. The fuel according to the invention was prepared from 658 g of unleaded petrol with an octane number of 91, 70 g of additive (composed of 0.7 part by weight of pentane carboxamide, 0.7 part by weight of cyclohexanol and 5.6 parts by weight of pentanedicarboxylic acid) and 272 g of tap water with a German degree of hardness of 23° in such a way that the additive was added to the water under continuous stirring, and the resulting mixture was added to the unleaded petrol under continuous stirring. Thereafter the mixture was homogenized in an electric mixer until a fully transparent fuel was obtained. The resulting fuel was filled into the previously emptied tank of the petrol-operated vehicle. After starting, the speed of the vehicle was increased in the usual way to 80 km/hour, and the car was driven with an approximately constant speed until the fuel run out. In this test the accelerating ability of the engine was the same as before, and no running irregularity or misfire was observed. Under these conditions a drive of 18.2 km could be taken. When repeating the test under the same conditions but using 1 kg of unleaded petrol with an octane number of 91, a drive of 15.5 km could be taken. No colour change of the spark plugs could be observed.

In the second stage of the test the consequences of the change-overs from the fuel according to the invention to normal fuel and from normal fuel to the fuel according to the invention were examined. Change-overs were performed by simply topping up the tank. No observable change in the operation of the engine could be found in either of the change-overs.

The additive disclosed in this example is applicable, upon appropriately increasing its amount, up to a petrol:water weight ratio of 60:40.

The quality test results of the fuel according to the invention, having the composition as disclosed in this Example, are listed in Table 1 below. For comparison purposes, the results observed with unleaded, water-free petrol with an octane number of 91 are also given.

Example 1

| Property | Fuel according to the invention | Unleaded normal petrol (octane number: 91) |
|---|---|---|
| Water content, % (MSZ 11745:1980) | 27.2 | 0 |
| Octane number | | |
| theoretical (MSZ 11708:1980) | 79.5 | 94.5 |
| motoric (MSZ 11706:1980) | 116.7 | 84.0 |
| Lead content, g/l (MSZ 10874:1979) | 0.001 | 0.002 |
| Corrosion effect on copper plate (MSZ 11788:1979A) | l.a. | l.a. |

(MSZ = Hungarian Standard)

Results of power tests performed on a test bench are given in Table 2. In these test the standard power was adjusted to 225 VA. 200 ml of fuel were used in each of the tests. The tests were performed with fuels obtained by admixing unleaded petrol (octane number: 91), the additive of the composition as given in Example 1, and water in an amount as indicated in Table 2.

TABLE 2

| | Petro (ON 91) | +5% water | +10% water | +15% water | +20% water | +25% water |
|---|---|---|---|---|---|---|
| Time unit, sec | 537 | 570 | 615 | 658 | 715 | 770 |
| Power, % | 100 | 106.1 | 121.0 | 126.3 | 127.5 | 143.3 |

Example 2

The test vehicle was a diesel fuel operated VW microbus with an engine of 1.5 l cylinder capacity and having no turbocharger, which had run before 48.000 km. The water-containing fuel was prepared as follows: 50 g of an additive (composed of 1.5 parts by weight of pentane-carboxamide, 0.5 part by weight of octanol and 3 parts by weight of decanedicarboxylic acid/$C_{10}H_{18}O_4$/) were added to 250 g of tap water, and the resulting aqueous mixture was added, under intense stirring, to 700 g of diesel fuel. Stirring was continued until a fully transparent liquid was obtained. Thereafter the trial run described in Example 1 was repeated. A drive of 17.0 km could be taken until the fuel run out, whereas when neat diesel fuel was used, only a drive of 16.0 km could be taken under otherwise the same conditions. No anomalies in operation could be observed upon change-over from the fuel according to the invention to normal diesel fuel and vice versa. The additive disclosed in this example is applicable, upon appropriately increasing its amount, up to a diesel fuel: water weight ratio of 60:40.

In a further test performed with the fuel disclosed in this Example, an Ikarusz 256 bus with a nominal engine power of 190 HP was used as test vehicle. The prescribed fuel consumption of the vehicle was 29.0 liters/100 km. Before starting the use of the fuel according to the invention, the vehicle was subjected to motor diagnostic tests, the results of which were as follows:

a) Compression final pressure:
Cylinder 1: 22 bars
Cylinder 2: 20 bars
Cylinder 3: 24 bars
Cylinder 4: 20 bars
Cylinder 5: 23 bars
Cylinder 6: 24 bars (average: 22.166 bars)

b) Opening pressure of the injectors: 190 bars c) Specific fuel consumption in 3 months before the test:
first month: 26.67 liters/100 km
second month: 24.74 liters/100 km
third month: 27.13 liters/100 km
average for the 3 months: 26.18 liters/100 km d) Lubricating oil consumption: 0.0 liter The summarized motor diagnostic test results gave the following qualification: the compression final pressure is only acceptable, as the deviations are rather high; both fuel consumption and lubricating oil consumption are excellent.

Thereafter the vehicle was operated continuously with the fuel disclosed in Example 2, and after a run of 8042 km the diagnostic tests were repeated. The following results were obtained:

a) Compression final pressure:
Cylinder 1: 22 bars
Cylinder 2: 23 bars
Cylinder 3: 23 bars
Cylinder 4: 23 bars
Cylinder 5: 23 bars
Cylinder 6: 22 bars (average: 22.66 bars)

b) Opening pressure of the injectors:
Cylinder 1: 190 bars
Cylinder 2: 195 bars
Cylinder 3: 195 bars
Cylinder 4: 195 bars
Cylinder 5: 180 bars
Cylinder 6: 185 bars c) Specific fuel consumption during the test period: 27.01 liters/100 km d) Lubricating oil consumption: none The summarized motor diagnostic test results gave the following qualification: although there is a slight increase in the compression final pressure of the cylinders, the overall pressure shows a fully uniform pattern, thus the result is excellent. Although there is a negligible increase in specific fuel consumption (3.1%), it still remains significantly below the prescribed value (93.13%).

We claim:

1. An additive composition for stabilizing a water-containing liquid hydrocarbon fuel, which comprises:

an alcohol of 5 to 10 carbon atoms;

0.5 to 3 parts by weight, calculated for 1 part by weight of said alcohol, of a carboxylic amide of 5 to 10 carbon atoms; and 3 to 10 parts by weight, calculated for 1 part by weight of said alcohol, of a carboxylic acid of 5 to 10 carbon atoms.

2. An additive as claimed in claim 1 for stabilizing a water-containing light mineral oil cut fuel, in which the alcohol, carboxylic acid amide and carboxylic acid components each comprise up to 7 carbon atoms.

3. A stabilized liquid fuel for an internal combustion engine, which comprises:

10 to 40% by weight of water;
45 to 85% by weight of a liquid hydrocarbon fuel; and
5 to 15% by weight of an additive as claimed in claim 1, wherein the above percentages are calculated for the total weight of said stabilized liquid fuel.

4. A stabilized liquid fuel as claimed in claim 3, wherein said liquid hydrocarbon fuel is a light mineral oil cut fuel, and wherein the alcohol, carboxylic acid amide and carboxylic acid components of said additive each comprise up to 7 carbon atoms.

5. A stabilized liquid fuel as claimed in claim 3, which comprises 15% to 35% by weight of water, calculated for the total weight of said stabilized liquid fuel.

6. A stabilized liquid fuel as claimed in claim 3, which comprises 50% to 70% by weight of said liquid hydrocarbon fuel, calculated for the total weight of said stabilized liquid fuel.

7. A stabilized liquid fuel as claimed in claim 3, which comprises 10% to 15% by weight of said additive, calculated for the total weight of said stabilized liquid fuel.

8. A method for stabilizing a water-containing liquid hydrocarbon fuel comprising adding to said water-containing fuel an additive of claim 1 or 2, or a liquid hydrocarbon fuel comprising said additive.

9. A stabilized liquid fuel as claimed in claim 4, which comprises 15% to 35% by weight of said water, calculated for the total weight of said stabilized liquid fuel.

10. A stabilized liquid fuel as claimed in claim 4, which comprises 50% to 70% by weight of said liquid hydrocarbon fuel, calculated for the total weight of said stabilized liquid fuel.

11. A stabilized liquid fuel as claimed in claim 4, which comprises 10% to 15% by weight of said additive, calculated for the total weight of said stabilized liquid fuel.

12. A stabilized liquid fuel as claimed in claim 5, which comprises 50% to 70% by weight of said liquid hydrocarbon fuel, calculated for the total weight of said stabilized liquid fuel.

13. A stabilized liquid fuel as claimed in claim 9, which comprises 50% to 70% by weight of said liquid hydrocarbon fuel, calculated for the total weight of said stabilized liquid fuel.

14. A stabilized liquid fuel as claimed in claim 5, which comprises 10% to 15% by weight of said additive, calculated for the total weight of said stabilized liquid fuel.

15. A stabilized liquid fuel as claimed in claim 6, which comprises 10% to 15% by weight of said additive, calculated for the total weight of said stabilized liquid fuel.

16. A stabilized liquid fuel as claimed in claim 9, which comprises 10% to 15% by weight of said additive, calculated for the total weight of said stabilized liquid fuel.

17. A stabilized liquid fuel as claimed in claim 10, which comprises 10% to 15% by weight of said additive, calculated for the total weight of said stabilized liquid fuel.

18. A stabilized liquid fuel for an internal combustion engine, which comprises:

10% to 40% by weight of water;
45% to 85% by weight of a liquid hydrocarbon fuel; and
5% to 15% by weight of an additive, wherein all percentages are calculated for the total weight of said stabilized liquid fuel, and wherein said additive is selected from the additive of claim 1 or claim 2.

19. A process for preparing a stabilized liquid fuel of claim 18, which comprises mixing together said water, said liquid hydrocarbon fuel and said additive, or the individual components thereof, to form said stabilized fuel.

20. A liquid hydrocarbon fuel comprising the additive of claim 1 or claim 2.

* * * * *